United States Patent Office 2,940,836

Patented June 14, 1960

2,940,836

ETCHING

Marvin H. Fishaber, Saginaw, Mich., assignor to The Dow Chemical Company, Midland, Mich., a corporation of Delaware No Drawing. Filed July 31, 1956, Ser. No. 601,116

10 Claims. (Cl. 41—42)

This invention relates to a method of etching metal. It more particularly concerns an improved method of producing a relief in the surface of an object easily soluble in acid, as in making a printing plate by etching with an acid solution.

A new etching process was introduced into the art, and one which is particularly adapted to photoengraving, upon the issuance of Patents Nos. 2,640,763 to 2,640,767, inclusive, on June 2, 1953, to John A. Easley and Harry E. Swayze. In this new etching procedure, the bath composition is so controlled and the bath itself is impinged upon the photoengraving plate in such a manner that lateral etching and/or undercutting of the image areas is reduced or, in some cases, eliminated. A major advantage of this procedure lay in the fact that the time consuming powdering techniques were substantially eliminated.

In the commercial use of the above-noted etching patents, it was found that the bath composition must be varied to obtain optimum results depending upon the type of image that is to be etched. In linear areas, where the image to be etched comprises printed matter or images containing only solid lines, it has been generally found that the image must be etched to a depth of at least 0.020 inch. In such cases undercutting is a problem and the amount of water-immiscible organic liquid employed must be maintained at a relatively high level. When treating photoengraving plates containing half-tone areas, which comprise images made up of a plurality of very small dots which produce the effect of shading due to variation in the size of the dots on different portions on the plate, it is necessary to etch only from 0.0025 inch up to 0.007 inch, depending upon the screen ruling employed, the amount of water-immiscible organic liquid used in these baths may be reduced to a minimum. Line areas and half-tone areas, by themselves, present no great problem in the use of the new process so described, but it has been found to be very difficult to etch plates known in the trade as combination plates, which contain both half-tone areas and line areas. This problem is due to the fact that the depth to which line areas are generally etched is many times greater (by a factor of 3 to 10) than the depth to which half-tone areas are normally etched. While these combination plates represent a highly specific problem in the photoengraving art, they are still representative of an important phase of this art because of the large number of such plates used in newspapers.

It is an object of this invention to provide an improved method and bath for etching acid-soluble metal objects, particularly developed photoengraving plates which bear a resist image. Another object of this invention is to provide an improved method and bath for etching developed photoengraving plates containing both half-tone and line areas.

It has been discovered that the etching action of etching baths, such as defined in the above-cited patents to Swayze and Easley, may be greatly enhanced by adding thereto a sulfur-containing compound soluble in aqueous dilute nitric acid solution selected from the group consisting of inorganic sulfates, organic sulfates and sulfonates in which the organic portion is selected from the group consisting of alkyl radicals containing not more than 8 carbon atoms, naphthenic radicals, phenyl radicals, and alkyl phenyl radicals wherein the alkyl portion comprises one or more alkyl groups and contains a maximum of 6 carbon atoms. The inorganic sulfates include sulfuric acid, sodium sulfate, sodium acid sulfate, magnesium sulfate, aluminum sulfate and ammonium sulfate. The organic sulfates comprise diethyl sulfate, dimethyl sulfate, and ethyl hydrogen sulfate. Illustrative of the organic sulfonates are n-butyl sodium sulfonate, benzene sulfonic acid, sodium xylene sulfonate, sodium toluene sulfonate, and n-butyl sodium sulfonate. It will be apparent to those skilled in the art that compounds which, in a nitric acid solution, produce the sulfates or sulfonates above defined may also be employed. For reasons of economy and performance, either sulfuric acid or sodium sulfate are preferably employed.

The sulfur-containing compound must be present in solution in the bath in amounts such that the sulfur content of the solute ranges from 0.02 to 0.3 grams per liter of bath solution. This range defines critical limits for sulfuric acid and sodium sulfate, but it will be apparent to those skilled in the art that certain variations in this range will occur depending upon the particular sulfur-containing compound employed. Also, the sulfur content of the solute may be in part made up from sulfur derived from adventitious elements, so that the amount of sulfur-containing compound added may vary, for example, with the sulfate content of the water employed. In order to derive the enhanced etching action required to produce satisfactory combination plates, sufficient sulfur-containing compound must be added so that the sulfur content in the solute ranges from 0.03 to 0.18 grams per liter of bath solution, and the preferred range is from 0.04 to 0.095 grams per liter. The present invention is all the more remarkable when it is considered just how small a percentage of the sulfur-containing compound is required to produce the desired results. The addition of an equivalent amount of nitric acid produces no perceptible distinction in the characteristics of the bath.

Although the ability of the sulfur-containing compound to enhance etching action is exhibited to varying degrees when added to each of the baths defined in Patents Nos. 2,640,763 to 2,640,767, inclusive, an unusually pronounced improvement in the etching action has been noted with baths such as those defined in Patent No. 2,640,765. These baths comprise a mixture of an aqueous solution containing nitric acid, an ester of sulfosuccinic acid and an aliphatic alcohol having from 4 to 12 carbon atoms, and a water-immiscible organic liquid substantially unreactive with the aqueous nitric acid solution.

In applying baths comprising the present invention to the etching of combination plates, it has been found necessary to maintain an extremely delicate balance between a number of factors in order to produce commercially acceptable plates. For this purpose, the commercially operable baths are those wherein the ingredients are maintained within quite narrow limits.

Experimentation has shown that when this bath is to be employed in the etching of combination plates the nitric acid content should be maintained between 3 and 15 percent by volume measured as 42° Baumé acid. As used in this specification and in the attached claims the term "percent by volume" refers to the total volume of the etching bath. "Nitric acid" as used herein refers in each instance to 42° Baumé acid and "concentrated sulfuric acid" is defined as reagent grade acid having a specific gravity of 1.84. When the concentration of the nitric acid falls below 3 percent the time required for etching the plate is unduly increased, while above 15 percent undercutting of the image area may occur. It is preferred that the nitric acid content be maintained in the range of 5.0 to 11.0 percent by volume.

As above set forth, the wetting agents that we prefer to employ are those described and claimed in Patent Number 2,640,765. When the bath is to be used to etch combination plates, however, it is necessary to limit these wetting agents to an ester of sulfosuccinic acid and an aliphatic alcohol having from 7 to 9 carbon atoms. Of these esters, we prefer to employ dioctyl sodium sulfosuccinate. The amount of wetting agent employed ranges from 2.0 to 10.0 grams per liter. Below 2 grams per liter of wetting agent, undercutting may occur. When the wetting agent is employed in amounts greater than 10.0 grams per liter of bath solution, a rough uneven etching of the metal surface may occur.

For general purposes, any water-immiscible organic liquid which is substantially unreactive with the aqueous nitric acid solution may be employed. For combination plates, however, it is preferred to employ liquid alkylbenzenes, or mixtures thereof, wherein the alkyl portion is composed of one or more alkyl groups having a maximum of 4 carbon atoms per group and the total number of carbon atoms in the alkyl portion does not exceed 10. These liquid alkylbenzenes include such compounds as monoethylbenzene, the diethylbenzenes, the dimethylbenzenes, the tetramethylbenzenes, the tetraethylbenzenes and the monobutylbenzenes. The amount of alkylbenzene employed may vary from 2.0 percent to 4.5 percent by volume. An uneven etching with excessive filming is obtained when less than 2.0 percent by volume of alkylbenzene is employed and a minimum of 2.5 percent is preferred. When more than 3.3 percent alkylbenzene is used an inadequate depth of etch is generally obtained in the half-tone areas, although up to 4.5 percent by volume of alkylbenzene can be used and still produce acceptable combination plates under some conditions.

In etching photoengraving plates with baths of the present invention, commercial practise has shown that it is generally necessary to condition the baths by dissolving magnesium therein in order to obtain a plate that will be satisfactory for printing purposes. Although continued use of the bath will itself effect the required conditioning, initial conditioning is essential if the first few plates etched in the bath are to be commercially useable. It has been discovered that the addition of a soluble nitrate salt, such as magnesium nitrate or sodium nitrate, will also condition the bath. When magnesium is dissolved in the bath, some of the nitric acid is used up. The addition of a soluble nitrate does not alter the nitric acid content of the bath, so that somewhat lower acid concentrations can be used with soluble nitrates as conditioning agents than those acid concentrations set forth above, which are intended for use when the bath is conditioned by dissolving magnesium in the bath. The amount of magnesium dissolved in the bath for conditioning purposes will range from about 3 to 5 grams per liter. The best manner of defining this bath conditioning factor is by reference to the molar ratio between the hydrogen content of the nitric acid and the total nitrate radical present in the bath. The nitrate addition, or dissolution of magnesium, should be so regulated that this molar ratio of hydrogen to nitrate will range from 0.3 to 0.9 and preferably between 0.4 and 0.8.

The temperature of the bath is preferably maintained between 70 and 75° F. It will be apparent to those skilled in the art that as the temperature varies, the composition of the bath must be altered to compensate for higher or lower temperatures. The length of time required to etch a combination plate using the preferred bath compositions above set forth will vary from 7½ minutes in a fresh bath to 15 minutes in a used bath. A deep etch bath, such as that disclosed in U.S. Patent No. 2,640,765, may be employed to increase the depth of etch in the line areas and open areas.

The following examples are illustrative of the present invention:

*Example 1*

A plate 18 inches by 24 inches by 0.064 inch formed of a magnesium-base alloy having a nominal composition of approximately 3.0 percent aluminum, 1.0 percent zinc, 0.06 percent manganese, 0.025 percent calcium and minor traces of other impurities, the balance being magnesium, was coated with a conventional polyvinyl alcohol photoresist and exposed through a photographic negative having images including a 65 screen half-tone area with some highlight drop out areas and line areas comprising type lines and illustrations. After the exposure, the plate was developed, leaving a resist corresponding to the image of the printed matter and the half-tone area, the remainder of the plate being bare. The resist image on the plate was set by heating the plate in an oven for six minutes, the oven temperature being maintained at 450° F. The plate was then descummed by a 2 minute immersion in an aqueous solution consisting of 12 oz./gal. of potassium hydroxide and 2 oz./gal. of potassium permanganate. An etching bath was made up having the following formulation:

| | | |
|---|---|---|
| Nitric acid (42° Bé.) | liters | 16 |
| Dioctyl succinate ester [1] | grams | 900 |
| Diethylbenzene | liters | 3.3 |
| $H_2SO_4$ (1.84 sp. gr.) | cc | 6 |
| Water, sufficient to make 134 liters. | | |

[1] A material comprising 75 percent by weight of dioctyl-sodium sulfosuccinate, 20 percent water and 5 percent ethyl alcohol.

The bath was conditioned by etching an 18 inch by 24 inch sheet of magnesium photoengraving plate for about 18 minutes at 600 r.p.m. paddle speed and thus dissolving 600 grams of magnesium in the bath.

The above bath formulation was placed in an etching machine corresponding to that disclosed in Patent No. 2,665,048 and maintained at a temperature 72° F. The plate was held with the image bearing side down at a height of about 3 inches above the uppermost point of travel of the tips of the paddles. These paddles were positioned in the bath and splashed the bath upwardly against the image-bearing side of the plate. The paddles were rotated for an initial period of 2 minutes at 600 r.p.m. and the speed was then dropped to 500 r.p.m. for one-half minute, with final reduction in paddle speed to 380 r.p.m. for a period of 7 minutes. The etched plate was rinsed and dried and the large bare portions thereof were found to be etched to a depth of .016 inch. The half-tone area was etched to a depth of .006 inch in the highlight areas and showed no undercutting or loss of dots. In type of about 8 point size there was an etch depth of .015 inch in the areas between the lines.

*Example 2*

Using a plate 18 inches by 6 inches by 0.064 inch of the same magnesium-base alloy and coated with the same resist as defined in Example 1, all of the procedures of Example 1 were followed except for a different etching bath and some variation in the paddle speed employed. The bath used had the following composition:

| | | |
|---|---|---|
| Nitric acid (42° Bé.) | liters | 16 |
| Dioctyl succinate ester [1] | grams | 950 |
| Diethylbenzene | liters | 4.15 |
| Sodium sulfate (anhydrous) | grams | 50 |
| Water, sufficient to make 134 liters. | | |

[1] As defined in Example 1.

The paddle speed initially was 600 r.p.m. for 2 minutes, followed by one minute at 500 r.p.m. and finally 6½ minutes at 380 r.p.m. Substantially identical depths of etch were obtained as in Example 1.

The amount of sulfur-containing compound, calculated on the basis of sulfur content, was 0.0268 gram/liter in Example 1 using $H_2SO_4$ and 0.084 gram in Example 2 using sodium sulfate (anhydrous). The amount of sulfur-containing compound, nitric acid, wetting agent and water-immiscible organic liquid may be varied within the ranges above set forth. Plates of various compositions may be employed including zinc plates, plates composed of zinc alloys containing over 90 percent zinc, magnesium plates, and plates composed of magnesium alloys containing over 80 percent magnesium.

It will be apparent to those skilled in the art that the invention above described may be used to advantage in a variety of ways. The bath comprising the present invention may be employed to etch combination plates, plates containing only line areas, and plates containing only half-tone areas, although it is unusually effective in etching combination plates. By the combination of an enhanced etching action arising from the addition of the sulfur-containing compound to the bath and by careful control of the velocity with which the bath impinges upon the plate to be etched, combination plates have been etched without requiring any powdering. This is achieved by operating the paddles in the bath at a relatively high velocity in the initial stages of etching, this velocity of impingement of the bath on the plate being sufficient to rapidly etch the half-tone area. When these half-tone areas have been etched to a satisfactory depth, which is normally from 0.0025 inch to 0.007 inch, the speed with which the paddles are rotated in the bath may be reduced so that the velocity of impingement of the bath on the plate is such that the etching of the line areas is continued and substantially no etching occurs in the half-tone area. This selective etching of the action bath is critical in producing commercially acceptable plates.

I claim:

1. An etching bath comprising (I) a water-immiscible organic liquid substantially unreactive with the following aqueous solution, and an aqueous solution containing (II) nitric acid, (III) a wetting agent selected from the group consisting of: (1) sulfosuccinic acid esters prepared from aliphatic alcohols having from 4 to 12 carbon atoms; (2) petroleum sulfonates containing from 18 to 30 carmon atoms; (3) saturated aliphatic acids containing from 5 to 26 carbon atoms; (4) esters of polyhydric alcohols containing from 2 to 6 carbon atoms and acids containing from 12 to 18 carbon atoms; and (IV) a nitric acid-soluble sulfur-containing compound selected from the group consisting of (A) inorganic sulfates and (B) organic sulfates and sulfonates wherein the organic portion is selected from the group consisting of (*a*) alkyl radicals containing not more than 8 carbon atoms, (*b*) naphthenic radicals, (*c*) phenyl radicals and (*d*) alkylphenyl radicals wherein the alkyl portion is composed of at least one alkyl group said alkyl group containing a maximum of 6 carbon atoms.

2. An etching bath comprising (I) 2.0 to 4.5 percent by volume of a water-immiscible organic liquid substantially unreactive with the following aqueous solution, and an aqueous solution containing (II) 3 to 15 percent by volume of nitric acid, (III) 2.0 to 10.0 grams per liter of a wetting agent selected from the group consisting of: (1) sulfosuccinic acid esters prepared from aliphatic alcohols having from 4 to 12 carbon atoms; (2) petroleum sulfonates containing from 18 to 30 carbon atoms; (3) saturated aliphatic acids containing from 5 to 26 carbon atoms; (4) esters of polyhydric alcohols containing from 2 to 6 carbon atoms and acids containing from 12 to 18 carbon atoms; and (IV) a nitric acid-soluble sulfur-containing compound in an amount such that 0.02 to 0.3 grams of sulfur per liter of bath results and wherein the sulfur-containing compound is selected from the group consisting of (A) inorganic sulfates and (B) organic sulfates and sulfonates wherein the organic portion is selected from the group consisting of (*a*) alkyl radicals containing not more than 8 carbon atoms, (*b*) napthenic radicals, (*c*) phenyl radicals and (*d*) alkylphenyl radicals wherein the alkyl portion is composed of at least one alkyl group said alkyl group containing a maximum of 6 carbon atoms.

3. An etching bath comprising (I) 2.5 to 3.3 percent by volume of a water-immiscible organic liquid substantially unreactive with the following aqueous solution, and an aqueous solution containing (II) 5.0 to 11.0 percent by volume of nitric acid, (III) 2.0 to 10.0 grams per liter of a wetting agent selected from the group consisting of: (1) sulfosuccinic acid esters prepared from aliphatic alcohols having from 4 to 12 carbon atoms; (2) petroleum sulfonates containing from 18 to 30 carbon atoms; (3) saturated aliphatic acids containing from 5 to 26 carbon atoms; (4) esters of polyhydric alcohols containing from 2 to 6 carbon atoms and acids containing from 12 to 18 carbon atoms; and (IV) a nitric acid-soluble sulfur-containing compound in an amount such that 0.03 to 0.18 grams of sulfur per liter of bath results and wherein the sulfur-containing compound is selected from the group consisting of (A) inorganic sulfates and (B) organic sulfates and sulfonates wherein the organic portion is selected from the group consisting of (*a*) alkyl radicals containing not more than 8 carbon atoms, (*b*) naphthenic radicals, (*c*) phenyl radicals and (*d*) alkylphenyl radicals wherein the alkyl portion is composed of at least one alkyl group said alkyl group containing a maximum of 6 carbon atoms.

4. An etching bath comprising (I) a water-immiscible organic liquid substantially unreactive with the following aqueous solution, and an aqueous solution containing (II) nitric acid, (III) sulfosuccinic acid esters prepared from aliphatic alcohols having from 4 to 12 carbon atoms; and (IV) a nitric acid-soluble inorganic sulfate.

5. An etching bath comprising (I) 2.5 to 3.3 percent by volume of diethylbenzene and an aqueous solution containing (II) 5.0 to 11.0 percent by volume of nitric acid, (III) 2.0 to 10.0 grams per liter of sulfosuccinic acid esters prepared from aliphatic alcohols having from 7 to 9 carbon atoms; and (IV) sodium sulfate in an amount such that 0.03 to 0.18 grams of sulfur per liter results.

6. A process for etching a developed photoengraving plate containing both line and half-tone images thereon and consisting essentially of a metal of the group consisting of magnesium, magnesium-base alloys containing over 80 percent magnesium, zinc and zinc-base alloys containing over 90 percent zinc, which comprises impinging upon the surface thereof at a velocity sufficient to rapidly etch the half-tone areas, an etching bath comprising (I) a water-immiscible organic liquid substantially unreactive with the following aqueous solution, and an aqueous solution containing (II) nitric acid, (III) a wetting agent selected from the group consisting of: (1) sulfosuccinic acid esters prepared from aliphatic alcohols having from 4 to 12 carbon atoms; (2) petroleum sulfonates containing from 18 to 30 carbon atoms; (3) saturated aliphatic acids containing from 5 to 26 carbon atoms; (4) esters of polyhydric alcohols containing from 2 to 6 carbon atoms and acids containing from 12 to 18 carbon atoms; and (IV) a nitric acid-soluble sulfur-containing compound selected from the group consisting of (A) inorganic sulfates and (B) organic sulfates and sulfonates wherein the organic portion is selected from the group consisting of (*a*) alkyl radicals containing not more than 8 carbon atoms, (*b*) naphthenic radicals, (*c*) phenyl radicals and (*d*) alkylphenyl radicals wherein the alkyl portion is composed of at least one alkyl group said alkyl group containing a maximum of 6 carbon atoms.

7. A process for etching a developed photoengraving plate containing both line and half-tone images thereon and consisting essentially of a metal of the group consisting of magnesium, magnesium-base alloys containing over 80 percent magnesium, zinc and zinc-base alloys containing over 90 percent zinc, which comprises impinging upon the surface thereof at a velocity sufficient to rapidly etch the half-tone areas, an etching bath comprising (I) 2.0 to 4.5 percent by volume of a water-immiscible organic liquid substantially unreactive with the following aqueous solution, and an aqueous solution containing (II) 3 to 15 percent by volume of nitric acid, (III) 2.0 to 10.0 grams per liter of a wetting agent selected from the group consisting of: (1) sulfosuccinic acid esters prepared from aliphatic alcohols having from 4 to 12 carbon atoms; (2) petroleum sulfonates containing from 18 to 30 carbon atoms; (3) saturated aliphatic acids containing from 5 to 26 carbon atoms; (4) esters of polyhydric alcohols containing from 2 to 6 carbon atoms and acids containing from 12 to 18 carbon atoms; and (IV) a nitric acid-soluble sulfur-containing compound in an amount such that 0.02 to 0.3 grams of sulfur per liter of bath results and wherein the sulfur-containing compound is selected from the group consisting of (A) inorganic sulfates and (B) organic sulfates and sulfonates wherein the organic portion is selected from the group consisting of (*a*) alkyl radicals containing not more than 8 carbon atoms, (*b*) naphthenic radicals, (*c*) phenyl radicals and (*d*) alkylphenyl radicals wherein the alkyl portion is composed of at least one alkyl group, said alkyl group containing a maximum of 6 carbon atoms.

8. A process or etching a developed photoengraving plate containing both line and half-tone images thereon and consisting essentially of a metal of the group consisting of magnesium, magnesium-base alloys containing over 80 percent magnesium, zinc and zinc-base alloys containing over 90 percent zinc, which comprises impinging upon the surface thereof at a velocity sufficient to rapidly etch the half-tone areas, an etching bath comprising (I) 2.5 to 3.3 percent by volume of a water-immiscible organic liquid substantially unreactive with the following aqueous solution, and an aqueous solution containing (II) 5.0 to 11.0 percent by volume of nitric acid, (III) 2.0 to 10.0 grams per liter of a wetting agent selected from the group consisting of: (1) sulfosuccinic acid esters prepared from aliphatic alcohols having from 4 to 12 carbon atoms; (2) petroleum sulfonates containing from 18 to 30 carbon atoms; (3) saturated aliphatic acids containing from 5 to 26 carbon atoms; (4) esters of polyhydric alcohols containing from 2 to 6 carbon atoms and acids containing from 12 to 18 carbon atoms; and (IV) a nitric acid-soluble sulfur-containing compound in an amount such that 0.03 to 0.18 grams of sulfur per liter of bath results and wherein the sulfur-containing compound is selected from the group consisting of (A) inorganic sulfates and (B) organic sulfates and sulfonates wherein the organic portion is selected from the group consisting of (*a*) alkyl radicals containing not more than 8 carbon atoms, (*b*) naphthenic radicals, (*c*) phenyl radicals and (*d*) alkylphenyl radicals wherein the alkyl portion is composed of at least one alkyl group, said alkyl group containing a maximum of 6 carbon atoms.

9. A process for etching a developed photoengraving plate containing both line and half-tone images thereon and consisting essentially of a metal of the group consisting of magnesium, magnesium-base alloys containing over 80 percent magnesium, zinc and zinc-base alloys containing over 90 percent zinc, which comprises impinging upon the surface thereof at a velocity sufficient to rapidly etch the half-tone areas, an etching bath comprising (I) a water-immiscible organic liquid substantially unreactive with the following aqueous solution, and an aqueous solution containing (II) nitric acid, (III) sulfosuccinic acid esters prepared from aliphatic alcohols having from 4 to 12 carbon atoms; and (IV) a nitric acid-soluble inorganic sulfate.

10. A process for etching a developed photoengraving plate containing both line and half-tone images thereon and consisting essentially of a metal of the group consisting of magnesium, magnesium-base alloys containing over 80 percent magnesium, zinc and zinc-base alloys containing over 90 percent zinc, which comprises impinging upon the surface thereof at a velocity sufficient to rapidly etch the half-tone areas, an etching bath comprising (I) 2.5 to 3.3 percent by volume of diethylbenzene and an aqueous solution containing (II) 5.0 to 11.0 percent by volume of nitric acid, (III) 2.0 to 10.0 grams per liter of sulfosuccinic acid esters prepared from aliphatic alcohols having from 7 to 9 carbon atoms; and (IV) sodium sulfate in an amount such that 0.03 to 0.18 grams of sulfur per liter results.

References Cited in the file of this patent

UNITED STATES PATENTS

| | | |
|---|---|---|
| 1,824,932 | Schermer | Sept. 29, 1931 |
| 1,836,445 | Chapman | Dec. 15, 1931 |
| 1,994,500 | Boller | Mar. 19, 1935 |
| 2,261,700 | Ryznar | Nov. 4, 1941 |
| 2,763,536 | Easley et al. | Sept. 18, 1956 |